March 7, 1933. A. J. LEWIS 1,900,387

CHUCKING MACHINE

Filed Sept. 25, 1930 3 Sheets-Sheet 1

Inventor

Arthur J. Lewis

By Wooster & Davis

Attorneys

March 7, 1933.   A. J. LEWIS   1,900,387
CHUCKING MACHINE
Filed Sept. 25, 1930   3 Sheets-Sheet 3
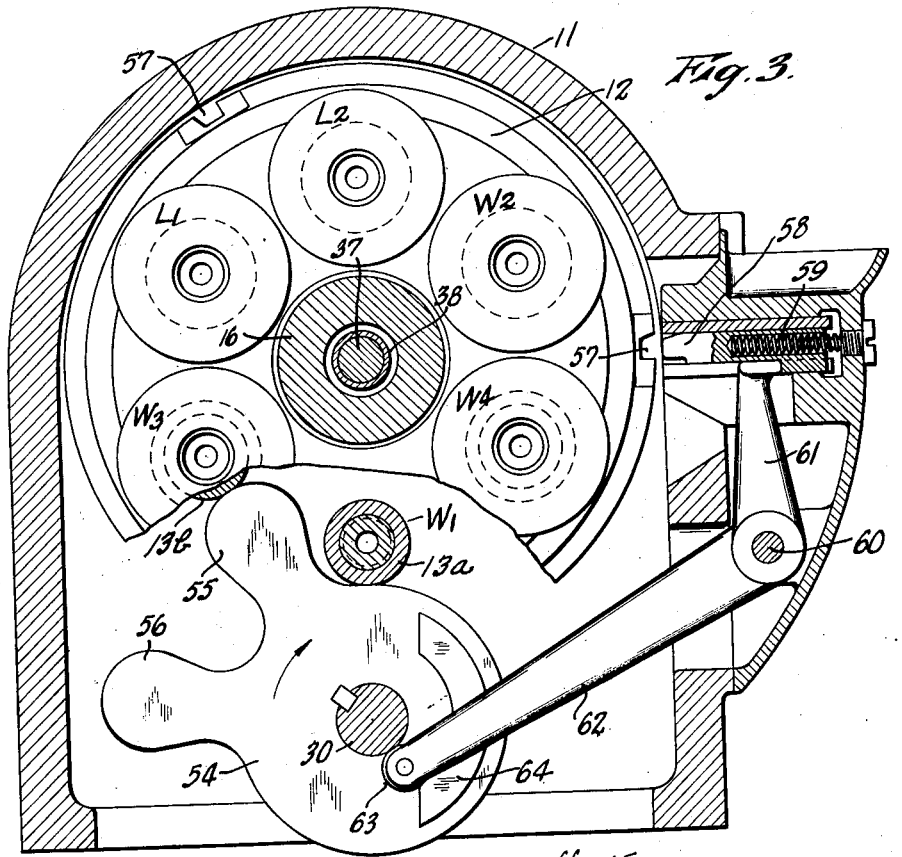
Fig. 3.
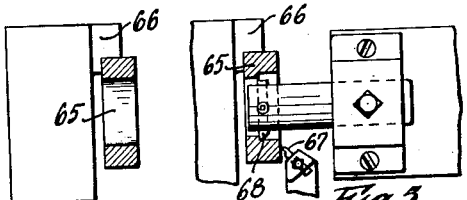
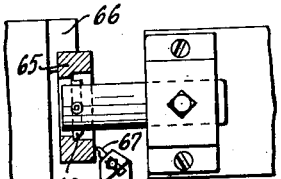
Fig. 5.
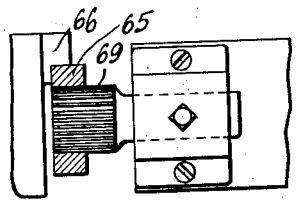
Fig. 6.
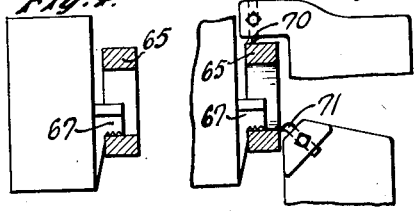
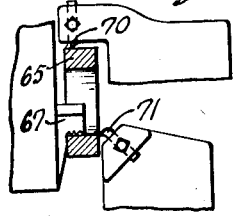
Fig. 8.
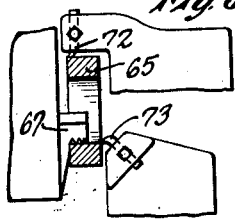
Fig. 9.
Fig. 4.
Fig. 7.
Inventor
Arthur J. Lewis
By Wooster & Davis
Attorneys Patented Mar. 7, 1933

1,900,387

UNITED STATES PATENT OFFICE

ARTHUR J. LEWIS, OF STRATFORD, CONNECTICUT, ASSIGNOR TO THE BAIRD MACHINE COMPANY, OF BRIDGEPORT, CONNECTICUT, A CORPORATION OF CONNECTICUT

CHUCKING MACHINE

Application filed September 25, 1930. Serial No. 484,357.

This invention relates to a so-called chucking machine or a machine adapted to perform a number of different operations simultaneously on similar pieces of work, and more particularly to this type of machine in which there is a rotary turret carrying a plurality of spindles provided with work holding means, with driving means for the spindles, tools for operating on the work carried by certain of the spindles so that there are provided loading stations and working stations, and means for indexing the turret to bring the spindles to the loading and working stations.

More particularly the invention has for an object to provide a machine of this character in which two distinct chuckings or series of working cycles can be performed simultaneously on the same machine. In other words, it is a particular object of the invention to provide a machine which is adapted for work which can be completed in, for example, two different holding means for the work with tools operating according to each type of holding means. Thus, for example, alternate spindles are fitted with chucks say for gripping the work on the outside wall permitting operations such as facing, boring and the like, while the alternate spindles are provided with chucks gripping the interior surfaces of the work permitting finishing of the outer or other surfaces which could not be machined while the work was held by the first set of chucks. Therefore, all the operations required to completely finish such work may be performed on a single machine.

With the foregoing and other objects in view, the invention consists in certain novel features of construction, combinations and arrangement of parts as will be more fully disclosed in connection with the accompanying drawings, forming a part of this specification, it of course, being understood that the invention is not limited to the specific details of construction shown, but is capable of different embodiments for carrying out the functions desired.

In these drawings:

Fig. 3 is a transverse section illustrating the indexing mechanism.

Figs. 4, 5 and 6 are views illustrating diagrammatically, by way of example, a plurality of operations that may be performed on one chucking of the work, and Figs. 7, 8 and 9 are similar views illustrating, by way of example, operations that may be performed on another chucking of the work.

Figure 1:
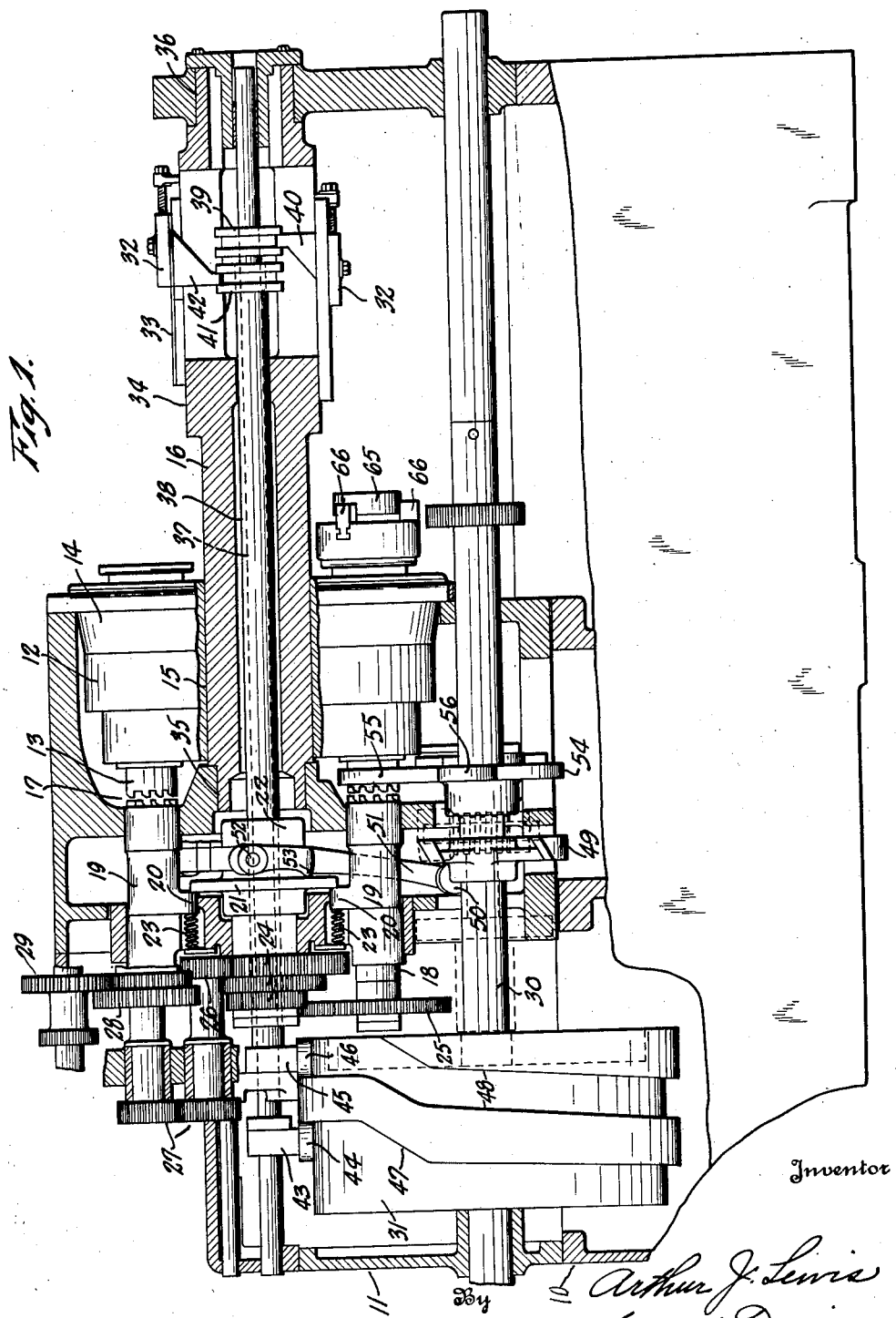
Fig. 1 is a longitudinal section through a machine embodying my invention, certain parts being shown in elevation.

The machine illustrated shows a horizontal chucking machine, that is one in which the work carrying spindles rotate on a horizontal axis and are carried in a turret also mounted to rotate on a horizontal axis to bring the spindles to different loading and working positions, but this machine is shown merely by way of illustration as the principles of the invention can be carried out in other types of machines and arrangements of the spindles and turret. The machine is also shown with six working spindles, but the number may be varied according to the size of the machine and the type of work to be done.

The construction of the machine is shown more or less diagrammatically and comprises a bed 10 on which the main frame 11 is mounted. Mounted to rotate in this frame is a turret 12 carrying any desired number of work carrying spindles 13, the drawings illustrating six of these spindles, although the number may be more or less as desired. The turret may rotate in an external bearing member 14 mounted in the frame and also on the central bearing 15 on the longitudinal central support 16. The spindles are individually driven at the various work stations by detachable clutch drives 17. There is one drive shaft 18 at each working station and the clutch on each drive shaft is engageable with the clutch on the work spindle which is at that particular station for driving that spindle. Each driving shaft 18 is mounted in a longitudinally sliding bearing member 19. These bearing members may have laterally extending lugs 20 adapted to engage a flange 21 on a longitudinally slidable member 22 to shift the driving shafts 18 to the left away from the work spindles 13 and disconnect the clutches 17 to permit indexing of the turret. Springs 23 tend to shift the members 19 and the shafts carried thereby toward the work spindles to engage the clutches 17 and thus drive the work spindles. The mounting for these drive shafts and driving means therefor is preferably similar to that disclosed in my co-pending application for chucking machine, Serial No. 362,974, filed May 14, 1929. The individual driving shafts are driven from a central set of gears 24 through individual gears 25, and as the gears 24 may be of different diameters and gears 25 of different diameters to mesh with the different gears 24, the individual work spindles may be driven at different speeds at the various work stations according to the work to be done. The gears 24 may be driven from any suitable source of power, not shown, through the gear train 26, 27, 28, 29.

Also, driven from the power mechanism so as to be operated in timed relation therewith is a main cam shaft 30 carrying a main cam drum 31. This drum carries control cams for operating certain tools at the various work stations. These tools are preferably mounted on carriers 32 mounted to slide longitudinally on guides 33 mounted on the central support 34, the central support being rigidly held at its opposite ends as indicated at 35 and 36 in the main frame 11. Within the support 16 is a longitudinally slidable rod and a tube for operating these tools. In the present instance there are shown a central rod 37 and a tube 38, the rod 37 carrying a head 39 adapted to engage an extension 40 on one or more tool carriers 32, while the tube 38 carries a head 41 connected to an arm or arms 42 for operating other tool carriers. At the opposite end of the machine a head 43 carrying a roller 44 is connected to the bar 37 while a similar head 45 carrying a roller 46 is connected to the tube 38. The rollers 44 and 46 are adapted to cooperate with cams 47 and 48 on the drum 31 to thus shift the tools longitudinally in certain timed relation with the indexing operation, the loading operations and the working operations.

The shaft 30 also carries a cam 49 cooperating with a roller 50 on a lever 51 pivoted at 52 and having lugs 53 engaging the flange 21 on the member 22 so that on shifting of the lever 51 by the cam 49, the members 19 are shifted to disconnect the clutches 17 between the driving shafts and the work carrying spindles at the various working stations, and when released permit members 19 to move in the opposite direction to permit the clutches 17 to engage. Of course, the cams 49, 47 and 48 are so proportioned and arranged as to perform their various operations in certain timed relation.

The shaft 30 also carries means for indexing the turret 12 between the different working operations. This device is shown as a member 54 keyed to the shaft and carrying a pair of arms 55 and 56 adapted to engage the projecting ends of the spindles 13 for indexing the turret. The object of the two arms 55 and 56 is to double index the turret on each indexing operation for a purpose presently to be described. Between the indexing operations and during the working operations the turret should be securely locked in position. For this purpose the turret is provided with the required number of recesses 57 adapted to receive the end of a locking bolt 58 normally held in locking position by means of a spring 59. Pivoted at 60 is a lever having one arm 61 connected to the bolt 58 and another arm 62 carrying a roller 63 cooperating with a cam 64, preferably mounted on the member 54 or otherwise connected so as to be operated in timed relation with the member 54. Thus, the cam 64 operates the lever 62 to withdraw the bolt 58 to unlock the turret just prior to the indexing operation and then permits the bolt to seat in the next notch 57 at the completion of the indexing operation and lock the turret in position until time for the next indexing operation.

Figure 2:
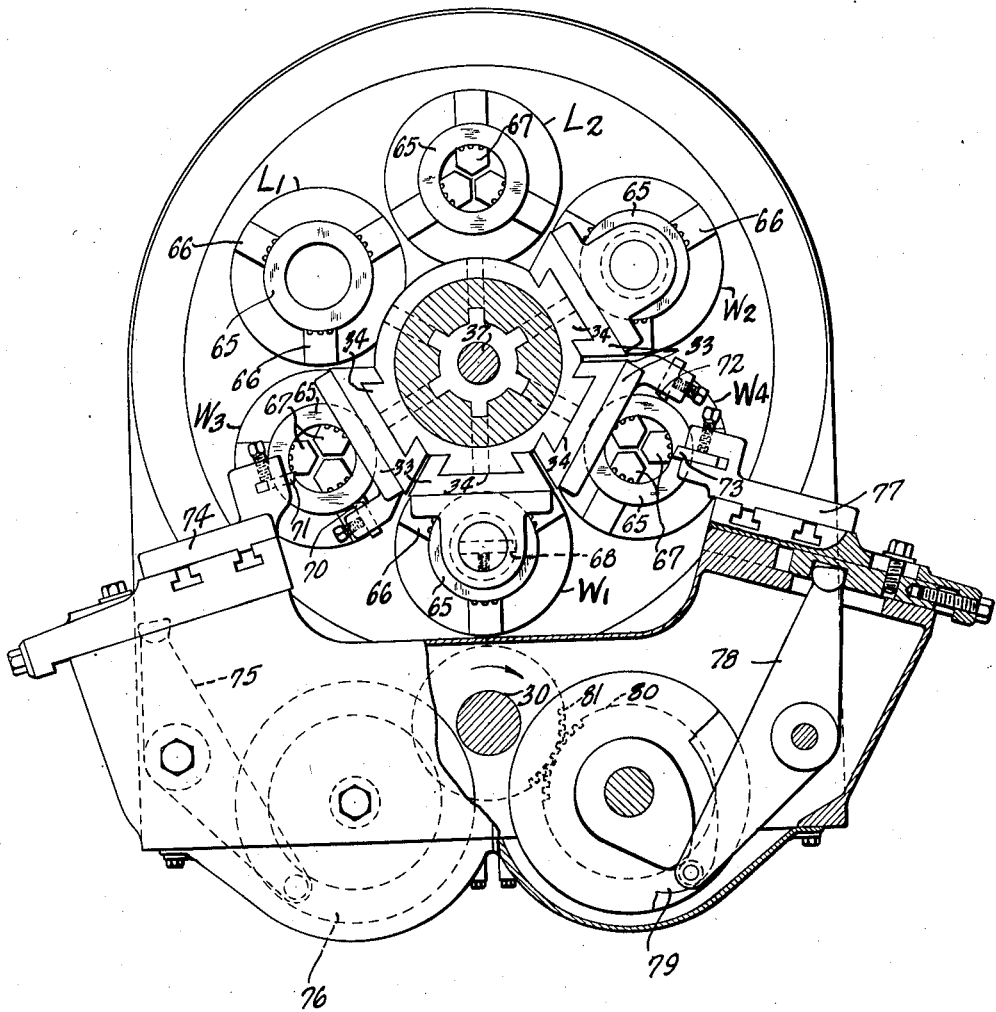
Fig. 2 is a partial end elevation and a partial transverse section in front of the work carrying devices.

Referring more particularly to Fig. 2, it will be noted that this machine has a plurality of loading stations. In the present instance we will call the station indicated by $L_1$ the first loading station and spindle indicated by $L_2$ the second loading station, it being understood the spindles are not driven at these stations, but remain idle. We will also call location $W_1$ the first working station, $W_2$ the second working station, $W_3$ the third working station and $W_4$ the fourth working station. It will be understood that the spindles at each of the four working stations are driven, and that various operations are performed by suitable tools on the work carried by the spindles at these stations. It will also be noted from Fig. 2 that, by way of illustration, the work indicated at 65 and at the two working stations $W_1$ and $W_2$ are held by one type of holding means, in the present instance by inwardly gripping chuck jaws 66 gripping the outer surface of the work. It will also be noted that at loading station $L_2$ and each of the working stations $W_3$ and $W_4$ the work is held by a different type of holding means, by way of illustration, by outwardly gripping jaws 67. It will, therefore, be seen that the work at stations $L_1$, $W_1$ and $W_2$ is held for a certain type of operations, while the work at stations $L_2$, and $W_3$ and $W_4$ is held for a different type of operations. Therefore, in indexing the turret between successive working operations, the turret should be indexed an amount to carry each spindle twice the distance between two adjacent spindles on each indexing operation. That is, spindle at station $L_1$ should be carried to working stations $W_1$, $W_1$ to $W_2$, and $W_2$ to $L_1$ on each indexing operation. Similarly spindle at $L_2$ should be carried to station $W_3$, $W_3$ to $W_4$, and $W_4$ to $L_2$ on similar indexing operations. This explains the reason for the two arms 55 and 56 on the indexing member 54. That is, arm 55 engages one of the spindles indicated at $13_a$, Fig. 3 to turn or index the turret the distance between two adjacent spindles and the arm 56 then immediately engages the spindle $13_b$ next following to index the turret a similar distance. In other words, for each rotation of the shaft 30 and member 54, which rotate one for each cycle of operation, the turret is given a double indexing, carrying each work spindle through the distance corresponding to twice the distance between adjacent spindles. Therefore, instead of each work spindle being shifted successively to adjacent positions it is shifted to alternate positions. While I have shown two sets of similar chucks with two loading stations and double indexing between each work cycle it will of course be understood that if desired there may be more than two sets for different chuckings and corresponding indexing with more than two loading stations.

In Figs. 4, 5 and 6 is illustrated, by way of example, operations which may be performed in the first chucking, that is, the chucking corresponding to stations $L_1$, $W_1$ and $W_2$, and in Figs. 7, 8 and 9 are illustrated, by way of example, operations that may be performed at the second chucking corresponding to stations $L_2$, $W_3$ and $W_4$, but it is to be understood that the operations illustrated are merely examples and that various other operations may be performed at these stations. Thus, at loading station $L_1$ the piece of work, in the present instance a ring member 65, may be mounted in an inwardly gripping chuck 66. Then, when indexed to the working position $W_1$ it may be faced by tool 67 and/or bored by tool 68 as indicated in Fig. 5. Then, when indexed to station $W_2$ it may be reamed by reamer 69 as indicated in Fig. 6. Then after it has been again shifted from $W_2$ to $L_1$ it may be removed from the inwardly gripping chuck and transferred to loading station $L_2$ and placed in an outwardly gripping chuck 67. At the same time it may be reversed to bring its other end or face in the outer position. Then on the next indexing operation the work may be carried from loading station $L_2$ to the working station $W_3$ and given a rough turning by tool 70 and a rough facing by tool 71 as shown in Fig. 8, and then after being carried to the next working station $W_4$ on the next indexing operation, it may be finished by turning tood 72 and facing tool 73 as indicated in Fig. 9. Then on the next indexing operation it is carried to loading station $L_2$ and may be removed from the machine as completed.

It will be evident from the foregoing description that on this single machine all the operations of finishing this piece which are such as to require different chuckings may be performed as a continuous operation and the work completed on this single machine. Thus, in operation the work, such as a blank 65, is loaded in the chuck or fixture at the loading station $L_1$ and on each successive two indexing operations a similar piece is loaded in the fixture of a correspondent alternate spindle, one at a time as they come to the loading station $L_1$. As each piece of work passes through from the working station $L_1$ they go first to working station $W_1$ to be operated upon by tools at that position, then to working station $W_2$ where it is acted upon by the tools at that position and then back to loading station $L_1$. At this station, the operator will remove it from the fixture and place it in the chuck or fixture on the next spindle at loading station $L_2$ which would be one of the three alternate spindles for the second operations. Then the work would be carried by successive indexing from loading station $L_2$ to working station $W_3$ to be operated upon by the tool or tools of this station, then to working station $W_4$ to be operated upon by the tools of that station, and then back to the loading station $L_2$ where it can be removed by the operator from the fixture or chuck as a completely finished article. It will be understood that during the complete cycle it has had two different sets of operations performed on it which required two different chucking operations and these operations are performed on it in the length of time which it takes to perform the longest single operation plus the time for indexing.

After the machine is operated between each indexing operation, the operator will remove the partly finished work piece from the chuck at loading station $L_1$, transfer it to the chuck at loading station $L_2$ and will then insert a new unfinished piece in the chuck at loading station $L_1$, and will perform these operations at each loading operation between successive indexing so that the finishing operation will be continuous. Thus, it will be evident that the first working station $W_1$ will be fitted with tools for the first operation of the first chucking, station $W_2$ will be fitted with tools for the second operation of the first chucking, station $W_3$ will be fitted with tools for the first operation of the second chucking and station $W_4$ will be fitted with tools for the second operation of the second chucking.

The facing or transversely moving tools are of course mounted on transversely moving slides. Thus, at station $W_3$ they are mounted on a transversely moving slide 74 mounted in a suitable guide and operated by a lever 75 from a suitable cam 76 driven from the shaft 30 or other parts of the machine so that it will be in certain timed relation with the indexing and other operations. At station $W_4$ the transversely moving tool may be mounted on a transversely moving slide 77 driven by lever 78 from any suitable cam 79 driven either from the shaft 30 by gears 80, 81 or other suitable parts of the machine in the same manner and in certain timed relation with the operation of the other devices.

It will be evident from the foregoing description that this machine is particularly adapted for finishing work which requires different types of operation involving different chuckings such as ball bearing races, gear blanks and so forth, and as the individual spindles can be driven at different relative speeds variations which are apt to be met in diameter of work between the first and second chuckings are easily taken care of. Also, as individual tool slides with independent adjustment are used at the various stations, they permit selection of the proper stroke or feed for the different operations. Automatic fixture or chuck control can be used such for instance as disclosed in my copending application for automatic chucking machine, Serial No. 310,156, filed October 3, 1928. Furthermore, the loading stations are positioned for convenient loading and unloading and the tools are all easily accessible and convenient for adjustment, and so forth.

Although, I have described the operation as beginning at the first loading station $L_1$, it will be evident that it might be advisable for some kinds of work to load it first at the station $L_2$, the work of the first chucking operations being performed at the stations $W_3$ and $W_4$ so as to bring the work first to the tools at these stations, and then at the close of the first chucking cycle transfer the work to the loading station $L_1$ so as to be operated on by the tools at the stations $W_1$ and $W_2$ during the second chucking operation. Other uses and operations will suggest themselves.

It will be evident that if it is desired to machine work requiring only two operations, the work holding means or chucks can be the same on all spindles, and then two similar unfinished pieces can be loaded in the fixtures, one at $L_1$ and the other at $L_2$. Thus the machine can be used to machine two pieces of work in the same manner at the same time giving double production. Also one set of spindles and corresponding tools can be set up for one series of operations and the other set for another series of different operations so that two pieces of work can be simultaneously machined or worked differently.

Having thus set forth the nature of my invention, what I claim is:

1. In a machine of the character described, a rotary turret, a plurality of work carrying spindles in said turret providing a plurality of loading stations adjacent each other on the same side of the turret and a plurality of working stations, means for driving the spindles at the working stations, and means for automatically indexing the turret in timed relation with the operation of the spindles to move each spindle the distance between alternate stations after the completion of each working cycle.

2. In a machine of the character described, a rotary turret, a plurality of work carrying spindles in said turret providing a plurality of adjacent loading stations and a plurality of working stations spaced forwardly of the loading stations in the direction of rotation of the turret, means for driving the spindles at the working stations, tools at the working stations, means for feeding said tools, and means for automatically indexing the turret to move each spindle twice the distance between two adjacent spindles at each indexing operation in certain timed relation with the operation of the tools.

3. In a machine of the character described, a rotary turret, a plurality of work spindles in said turret providing a plurality of adjacent loading stations and work stations, similar work holding means carried by each alternate spindle with the means on adjacent spindles capable of holding the same work piece in different manners, and means for indexing the turret to move each spindle twice the distance between adjacent spindles at the completion of each working cycle.

4. In a machine of the character described, a rotatable turret, a plurality of work spindles carried by said turret providing loading and working stations, means on each alternate spindle for holding pieces of work for a given series of operations, means on the remaining spindles for holding the same work for a different series of operations, and means for indexing the turret to move each spindle twice the distance between adjacent spindles between successive working operations.

5. In a machine of the character described, a rotatable turret, a plurality of work spindles carried by said turret providing a plurality of loading stations and a plurality of working stations, means for driving the spindles at the working stations, means on each of alternate spindles for holding pieces of work for a given series of operations, means on the remaining spindles for holding the same work for a different series of operations, and indexing means for shifting the turret between successive working operations to move each spindle twice the distance between adjacent spindles.

6. In a machine of the character described, a rotatable turret, a plurality of work spindles carried by said turret, similar means on each alternate spindle for holding similar pieces of work, tools for operating on the work so held, means on the remaining spindles for holding the same work by gripping on different surfaces than the first holding means, tools for performing operations on the work so held different from the first set of operations, and means for indexing the turret a plurality of stations between successive working operations.

7. In a machine of the character described, a rotatable turret, a plurality of work spindles carried by said turret, similar means on each alternate spindle for holding similar pieces of work, tools to perform certain operations on the work so held to partially machine it, means on the remaining spindles to hold the same work by different surfaces than the first holding means, tools for performing other machining operations on the work held by the second means, and means for indexing the turret.

8. In a machine of the character described, a rotatable turret, a plurality of work spindles carried by said turret, means on alternate spindles to outwardly grip the work, tools for performing certain operations on the work so held, means on the remaining spindles to inwardly grip the same work, means for performing operations on the work so held different from the first operations, and means for indexing the turret.

9. In a machine of the character described, a rotatable turret, a plurality of work spindles carried by said turret providing a plurality of adjacent loading stations and a plurality of working stations, means on alternate spindles including one loading station to outwardly grip the work, means on the remaining spindles to inwardly grip the same work, tools at the various working stations to perform machining operations on the work at the respective working stations, and means for indexing the turret a plurality of stations at a time to carry the work to the respective stations.

10. In a machine of the character described, a rotatable turret, a plurality of work spindles carried by said turret providing a plurality of loading stations and a plurality of working stations, means on alternate spindles including one loading station to outwardly grip the work, means on the remaining spindles to inwardly grip the same work, tools at the various working stations to perform machining operations on the work, means for feeding the tools, and automatic means for indexing the turret to shift each spindle between successive working operations twice the distance between adjacent spindles in certain timed relation with the operation of the tools.

11. In a machine of the character described, a rotatable turrret, a plurality of work spindles carried by said turret providing two adjacent loading stations and a plurality of working stations, means on the spindle at one loading station and alternate working stations for holding the work for a primary loading and machining operations, means on the spindle at the other loading station and the remaining working stations to hold the same work in a different manner for a secondary loading and other machining operations, and means for indexing the turret to move each spindle twice the distance between adjacent spindles between successive working operations.

12. In a machine of the character described, a rotatable turret, a plurality of work spindles in said turret providing a plurality of loading stations and a plurality of working stations, chucks on the spindle at one loading station and alternate work stations to grip inwardly on the work, chucks on the spindle at the other loading station and the remaining working stations to grip outwardly on the same work, means at the work stations for driving the spindles, means for disconnecting the driving means from the spindles to permit indexing of the turret, tools at the work stations for performing machining operations on the work at these stations, means for feeding the tools, means for indexing the turret to shift each spindle a distance equal to twice the distance between adjacent spindles, and means for operating the spindle driving means, the tool feeding means and the indexing means in certain timed relation.

13. In a machine of the character described, a rotatable turret, a plurality of work spindles carried by said turret providing loading and working stations, means on each of alternate spindles for holding pieces of work for a given series of operations, means on the remaining spindles for holding the same work for a different series of operations, individual driving means for the respective spindles at the various working stations whereby the different spindles may be driven at different speeds, and means for indexing the turret.

14. In a machine of the character described, a rotatable turret, a plurality of work spindles carried by said turret providing a plurality of loading stations and a plurality of working stations, means on the spindle at one loading station and alternate working stations for holding pieces of work for a given series of operations, means on the remaining spindles for holding the same work in a different manner for a different series of operations, individual driving means for the different spindles at the various working stations whereby the respective spindles may be driven at different speeds, and means for indexing the turret to move each spindle twice the distance between adjacent spindles at the completion of each working operation.

15. In a machine of the character described, a rotatable turret, a plurality of work spindles carried by said turret, means on alternate spindles to outwardly grip the work, means on the remaining spindles to inwardly grip the same work, and means for indexing the turret comprising a rotatable means having a plurality of arms to successively engage shoulders on the turret at each indexing operation, each arm being adapted to turn the turret sufficiently to shift the spindles a distance equal to the distance between adjacent spindles.

16. A method of machining a part in a multiple spindle machine tool adapted to index the spindles two stations at a time, comprising holding the part by gripping it on certain surfaces, partly machining the part in alternate stations while so held, holding the partly machined part by gripping it on other surfaces, and doing other machining operations in the other alternate stations while the part is so gripped.

17. A method of machining a part in a machine tool having a rotatable turret and a plurality of work carrying spindles in said turret forming a plurality of loading and working stations, comprising holding the part by gripping it in a given manner at one of the loading stations, indexing the turret to bring the part to alternate working stations and partly machining the part at these stations, removing the partly machined part from the first holding means and holding it by gripping in a different manner at the second loading station, indexing the turret to bring the part to the other alternate working stations, and performing other machining operations on the part at these latter stations.

18. The method of machining a part in a multiple spindle machine tool adapted to index the spindles a plurality of stations at a time, comprising first mounting the part upon one of the spindles and machining it while so held at certain of the stations to which it is carried by the indexing movement, and then transferring the part to another of the spindles and machining it at certain others of the stations to which it is carried by the indexing movement.

19. The method of machining a part in a multiple spindle machine tool adapted to index the spindles a plurality of stations at a time, comprising holding the part upon one of the spindles, partly machining the part at different stations while so held, and then holding the partly machined part on another spindle and performing other machining operations at other stations while the part is so held.

20. The method of machining a part in a machine tool having a plurality of spindles forming a plurality of loading and working stations, comprising mounting the part upon a spindle at one of the loading stations, indexing the spindles to bring the part to different working stations and machining the part at these stations, and then transferring the part to a spindle at another loading station, indexing the spindle to bring the part to other working stations, and further machining the part at these latter stations.

21. In a machine of the character described, a rotatable turret, a plurality of work spindles carried by said turret, similar means on each alternate spindle for holding similar pieces of work, tools for performing certain operations on the work so held, means on the remaining spindles for holding the same work by gripping on different surfaces than the first holding means, tools for performing different operations on the work so held, and indexing means to shift each spindle twice the distance between adjacent spindles at the completion of each working cycle.

22. In a machine of the character described, a rotatable turret, a plurality of work spindles carried by said turret, similar means on each alternate spindle for holding similar pieces of work, tools to perform certain operations on the work so held to partially machine it, means on the remaining spindles to hold the same work by different surfaces than the first holding means, tools for performing other machining operations on the work held by the second means, and indexing means for shifting the turret between successive working operations sufficient to move each spindle twice the distance between adjacent spindles.

23. In a machine of the character described, a rotatable turret, a plurality of work spindles carried by said turret, means on alternate spindles to outwardly grip the work, tools for performing certain operations on the work so held, means on the remaining spindles to inwardly grip the same work, tools for performing different operations on the work so held, and indexing means for shifting the turret between successive working operations sufficient to move each spindle twice the distance between adjacent spindles.

24. In a machine of the character described, a rotatable turret, a plurality of work spindles carried by said turret, providing two adjacent loading stations and a plurality of working stations, means on the spindle at one loading station and alternate working stations for holding the work for a primary loading and machining operations, means on the spindle at the other loading station and the remaining working stations to hold the same work in a different manner for a secondary loading and other machining operations, and means for indexing the turret between successive working operations to shift each spindle twice the distance between adjacent spindles.

25. A method of machining a part comprising holding the part by gripping it on certain surfaces, partly machining the part in alternate stations while so held, then holding the partly machined part by gripping it on other surfaces, performing different machining operations at other alternate stations between the first stations while the part is so gripped, and shifting the part between successive operations to the next alternate station.

In testimony whereof I affix my signature.

ARTHUR J. LEWIS.